(12) United States Patent
Kia et al.

(10) Patent No.: US 8,193,968 B1
(45) Date of Patent: Jun. 5, 2012

(54) SYSTEMS AND METHODS FOR SPACE SITUATIONAL AWARENESS AND SPACE WEATHER

(75) Inventors: Omid Ebrahimi Kia, North Bethesda, MD (US); Christopher Rodgers, Adamstown, MD (US); Brian Bradford, Vienna, VA (US)

(73) Assignee: Exelis, Inc., McLean, VA (US)

( * ) Notice: Subject to any disclaimer, the term of this patent is extended or adjusted under 35 U.S.C. 154(b) by 223 days.

(21) Appl. No.: 12/688,299

(22) Filed: Jan. 15, 2010

(51) Int. Cl.
G01S 13/00 (2006.01)
G01S 13/08 (2006.01)
H04B 7/185 (2006.01)

(52) U.S. Cl. ......... 342/26 A; 342/26 R; 342/59; 342/95; 342/118; 342/120; 342/352

(58) Field of Classification Search ............... 342/25 R, 342/25 A, 26 R, 26 A, 59, 94–97, 118, 120, 342/352
See application file for complete search history.

(56) References Cited

U.S. PATENT DOCUMENTS

| | | | | |
|---|---|---|---|---|
| 3,135,957 | A * | 6/1964 | Cunningham et al. | 342/26 A |
| 4,445,118 | A * | 4/1984 | Taylor et al. | 342/357.395 |
| 4,463,357 | A * | 7/1984 | MacDoran | 342/460 |
| 4,509,048 | A * | 4/1985 | Jain | 342/25 R |
| 4,611,929 | A * | 9/1986 | Holyer | 374/124 |
| 4,651,154 | A * | 3/1987 | Wong et al. | 342/356 |
| 4,667,203 | A * | 5/1987 | Counselman, III | 342/357.26 |
| 4,748,448 | A * | 5/1988 | Thompson | 342/26 A |
| 4,797,677 | A * | 1/1989 | MacDoran et al. | 342/352 |
| 4,843,397 | A * | 6/1989 | Galati et al. | 342/59 |
| 5,264,852 | A * | 11/1993 | Marquet | 342/26 A |
| 5,421,540 | A * | 6/1995 | Ting | 244/158.1 |
| 5,504,492 | A * | 4/1996 | Class et al. | 342/357.31 |
| 5,805,200 | A * | 9/1998 | Counselman, III | 342/357.26 |
| 5,960,097 | A * | 9/1999 | Pfeiffer et al. | 382/103 |
| 6,137,437 | A * | 10/2000 | Lin et al. | 342/104 |
| 6,198,907 | B1 * | 3/2001 | Torkington et al. | 455/12.1 |
| 6,204,800 | B1 * | 3/2001 | Neumann | 342/25 R |
| 6,380,886 | B1 * | 4/2002 | Jacobs | 342/120 |
| 6,441,776 | B1 * | 8/2002 | Hein et al. | 342/357.36 |
| 6,691,034 | B1 * | 2/2004 | Patera et al. | 701/301 |
| 6,833,805 | B1 * | 12/2004 | Belen'kii et al. | 342/26 D |
| 6,859,169 | B2 * | 2/2005 | Jones et al. | 342/352 |
| 6,864,828 | B1 * | 3/2005 | Golubiewski et al. | 342/25 C |
| 6,864,965 | B2 * | 3/2005 | DeFlumere | 356/4.01 |
| 6,983,198 | B2 * | 1/2006 | Weiner | 701/13 |
| 7,026,980 | B1 * | 4/2006 | Mavroudakis et al. | 342/90 |
| 7,095,359 | B2 * | 8/2006 | Matsuoka et al. | 342/26 R |
| 7,105,791 | B1 * | 9/2006 | Poller | 250/203.1 |
| 7,119,732 | B1 * | 10/2006 | Lam et al. | 342/27 |
| 7,336,217 | B2 * | 2/2008 | Voelker | 342/25 C |
| 7,474,249 | B1 * | 1/2009 | Williams et al. | 342/25 R |

(Continued)

*Primary Examiner* — Thomas Tarcza
*Assistant Examiner* — Peter Bythrow
(74) *Attorney, Agent, or Firm* — RatnerPrestia

(57) ABSTRACT

Systems and methods for detecting objects and weather in space are disclosed. A system for detecting an object in space and space weather includes at least one spacecraft, at least one radiation source, at least one detector, and a controller. The at least one radiation source and the at least one detector are coupled to the at least one spacecraft. The at least one radiation source is configured to transmit a signal. The at least one detector is configured to detect the signal. The signal may be reflected from an object in space. The controller is coupled to the spacecraft and is in communication with the plurality of detectors. The controller is programmed to calculate either a relative position of the object based or a plasma parameter in a region traversed by the signal based on the detected signal.

17 Claims, 11 Drawing Sheets

U.S. PATENT DOCUMENTS

| | | | |
|---|---|---|---|
| 7,486,227 B2 * | 2/2009 | Mitchell et al. | 342/120 |
| 7,576,688 B2 * | 8/2009 | Lehtinen | 342/196 |
| 7,623,065 B2 * | 11/2009 | Tillotson | 342/357.52 |
| 7,728,759 B2 * | 6/2010 | Tillotson et al. | 342/26 A |
| 7,739,048 B2 * | 6/2010 | Tillotson et al. | 702/3 |
| 7,755,011 B2 * | 7/2010 | Lam et al. | 244/3.1 |
| 7,812,758 B2 * | 10/2010 | Morris | 342/25 A |
| 7,837,153 B2 * | 11/2010 | Chesser et al. | 244/158.2 |
| 7,880,666 B2 * | 2/2011 | Tillotson et al. | 342/26 B |
| 8,019,712 B2 * | 9/2011 | Rigdon et al. | 706/47 |
| 2004/0113835 A1 * | 6/2004 | Jones et al. | 342/160 |
| 2004/0145514 A1 * | 7/2004 | Raney | 342/120 |
| 2004/0145515 A1 * | 7/2004 | Hall | 342/175 |

* cited by examiner

SYSTEMS AND METHODS FOR SPACE SITUATIONAL AWARENESS AND SPACE WEATHER

FIELD OF THE INVENTION

The present invention relates generally to systems and methods for detecting space weather and situational awareness, and more particularly to using spacecraft-mounted radiation sources to detect objects and weather in space.

BACKGROUND OF THE INVENTION

The Earth's orbit is home to many satellites and man-made space debris associated with orbital launches. The number of such space objects is growing steadily. These objects in orbital space may present an obstacle to the proper operation of space-based assets. Because of the cost and effort necessary to place assets in orbit, it is important that such assets are not damaged through contact with space objects. Thus, knowledge of the positions of objects in space, or space situational awareness, may be useful for the effective utilization of space-based assets.

Space weather may present another obstacle to the proper operation of space-based assets. Specifically, Earth's orbit may experience fluctuations in concentrations of charged particles. These charged particles may react with the electronic equipment in man-made satellites, thereby disrupting or even damaging their operation. Thus, knowledge of space weather may also be useful for effective utilization of space-based assets.

SUMMARY OF THE INVENTION

Aspects of the present invention are directed to systems and methods for detecting objects and weather in space. In accordance with one aspect of the present invention, a system for detecting an object in space includes at least one spacecraft, at least one radiation source, a plurality of detectors, and a controller. The at least one radiation source is coupled to the at least one spacecraft. The at least one radiation source is configured to transmit a signal. The plurality of detectors is coupled to the at least one spacecraft. The plurality of detectors are configured to detect the signal reflected from the object in space. The controller is coupled to the spacecraft and is in communication with the plurality of detectors. The controller is programmed to calculate a relative position of the object based on the detected signal.

In accordance with another aspect of the present invention, a system for detecting space weather includes at least one radiation source, at least one detector, and a controller. The least one radiation source is coupled to the at least one spacecraft. The at least one radiation source is configured to transmit a signal. The at least one detector is coupled to the at least one spacecraft. The at least one detector is configured to receive the signal. The controller is in communication with the at least one detector. The controller is programmed to calculate a plasma parameter in a region traversed by the signal based on the detected signal.

In accordance with yet another aspect of the present invention, a method for detecting an object in space with at least one spacecraft including at least one radiation source and a plurality of detectors is disclosed. The method includes transmitting a signal with the at least one radiation source, detecting the signal reflected from the object with the plurality of detectors, and calculating with a controller a relative position of the object based on the detected signal.

In accordance with still another aspect of the present invention, a method for detecting space weather with at least one spacecraft including at least one radiation source and at least one detector is disclosed. The method includes transmitting a signal with the at least one radiation source, detecting the signal with the at least one detector, and calculating with a controller a plasma parameter in a region traversed by the signal based on the detected signal.

BRIEF DESCRIPTION OF THE DRAWINGS

The invention is best understood from the following detailed description when read in connection with the accompanying drawings. It is emphasized that, according to common practice, the various features of the drawings are not to scale. On the contrary, the dimensions of the various features may be arbitrarily expanded or reduced for clarity. Included in the drawings are the following figures.

DETAILED DESCRIPTION OF THE INVENTION

Figure 1:
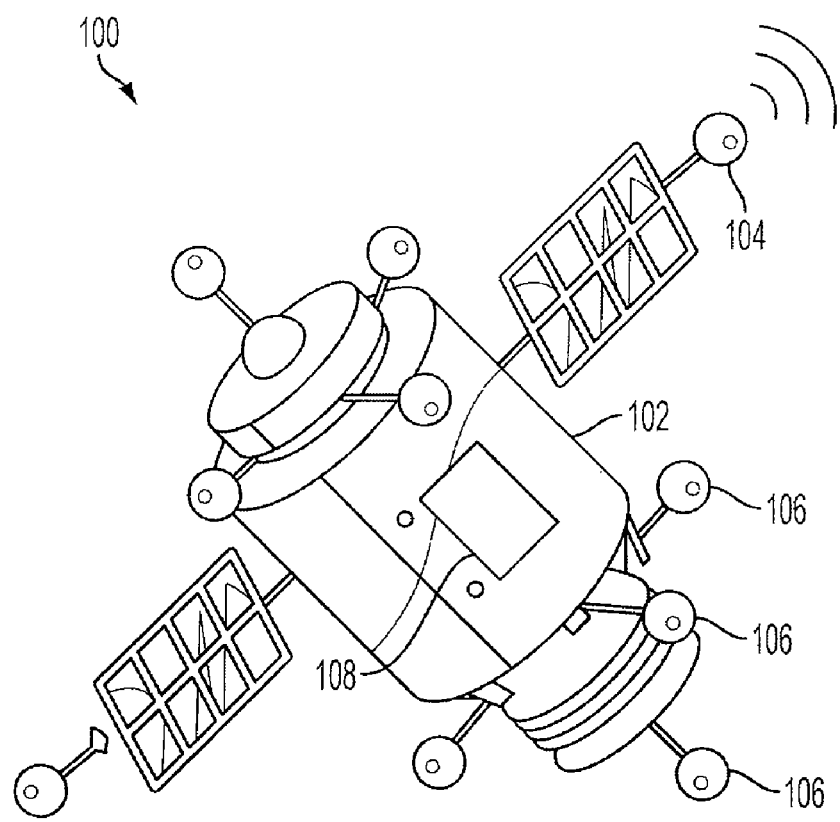
FIG. 1 depicts an exemplary system for detecting an object in space in accordance with aspects of the present invention.

The exemplary systems and methods disclosed herein are suitable for use on satellites or other spacecraft. The systems and methods may be employed by a single spacecraft or by arrays of spacecrafts. Incorporating the systems and methods in a single spacecraft may be suitable for determining localized space weather and situational awareness. Conversely, incorporating the systems and methods in an array of spacecrafts may be suitable for broad range determinations of space weather and situational awareness. It is contemplated that the disclosed exemplary systems and methods may be used over any number or type of spacecrafts and in any orientation without departing from the scope of the present invention.

As used herein, situational awareness refers to the relationship between a spacecraft and any surrounding objects. For example, situational awareness may include information relating to the position, orientation, and velocity of the spacecraft and information relating to the position, orientation, and velocity of any objects within a predefined range of the spacecraft.

As used herein, space weather relates to the matter and energy in a region of space surrounding the spacecraft. For example, space weather may relate to the presence, concentration, and energy of charged particles in a region of space. More specifically, space weather may refer to the presence of electron plasma in a region of space, and the parameters of that electron plasma, e.g., concentration, size, temperature, density, and plasma frequency.

The exemplary systems and methods disclosed herein may be suitable as sub-systems of a spacecraft having a separate primary purpose. Accordingly, it will be understood that incorporating the exemplary systems and methods herein into spacecrafts may impose certain restraints on the components used, e.g., size, weight, and power consumption. Suitable components for the exemplary systems and methods that meet the requirements for incorporation into spacecrafts will be known to one of ordinary skill in the art from the description herein.

Referring now to the drawings, FIGS. 1-4 are exemplary systems 100 for detecting an object in space in accordance with aspects of the present invention. The object in space may be space debris, spacecrafts, natural satellites, or any other objects in space. As an overview, system 100 includes a spacecraft 102, a radiation source 104, detectors 106, and a controller 108. Additional details of system 100 are described below.

Spacecraft 102 is a device configured for operation in space. In an exemplary embodiment, spacecraft 102 is a satellite in Earth orbit. Spacecraft 102 may be any man-made satellite having suitable size and power constraints to support system 100. For example, spacecraft 102 may be a Global Position System (GPS) or other navigation satellite, a communications satellite, a weather satellite, a space station, or any other orbiting spacecraft. Suitable spacecrafts 102 for use with the present invention will be known to one of ordinary skill in the art from the description herein.

Figure 2:
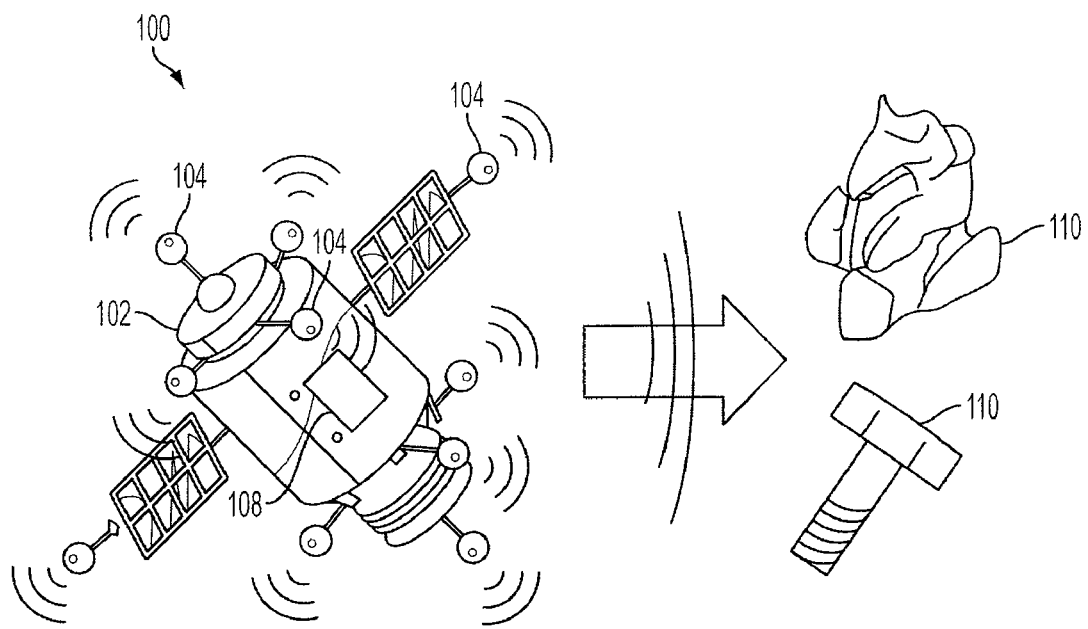
FIG. 2 depicts a transmitting operation of the exemplary system of FIG. 1.
Figure 3:
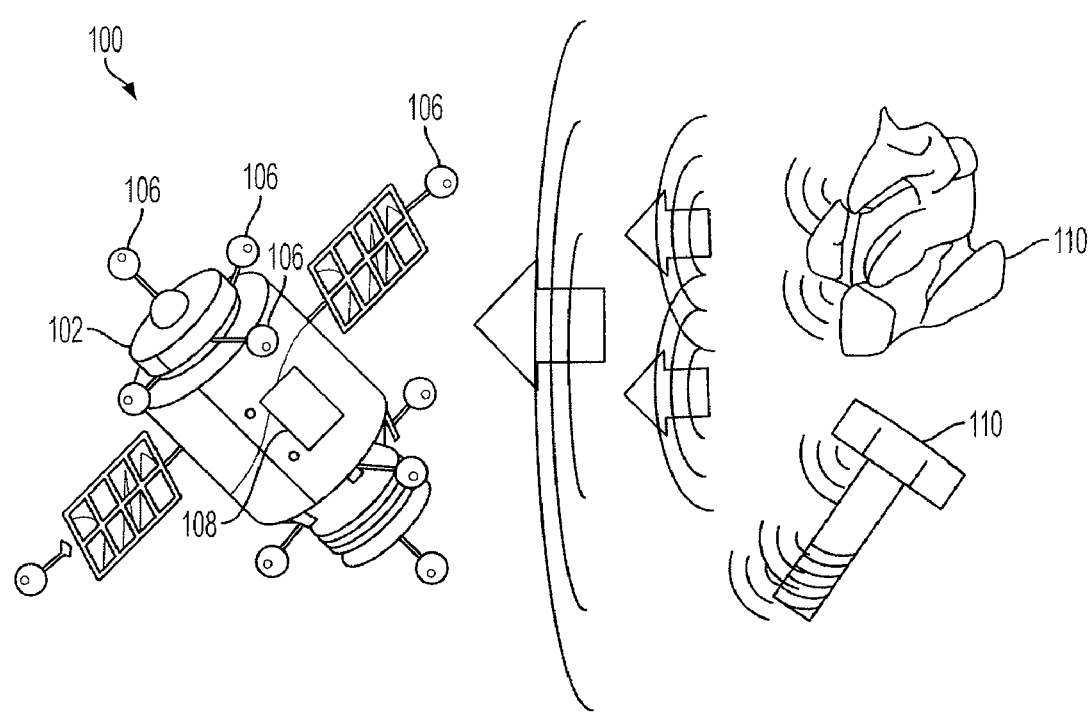
FIG. 3 depicts a detecting operation of the exemplary system of FIG. 1.
Figure 4:
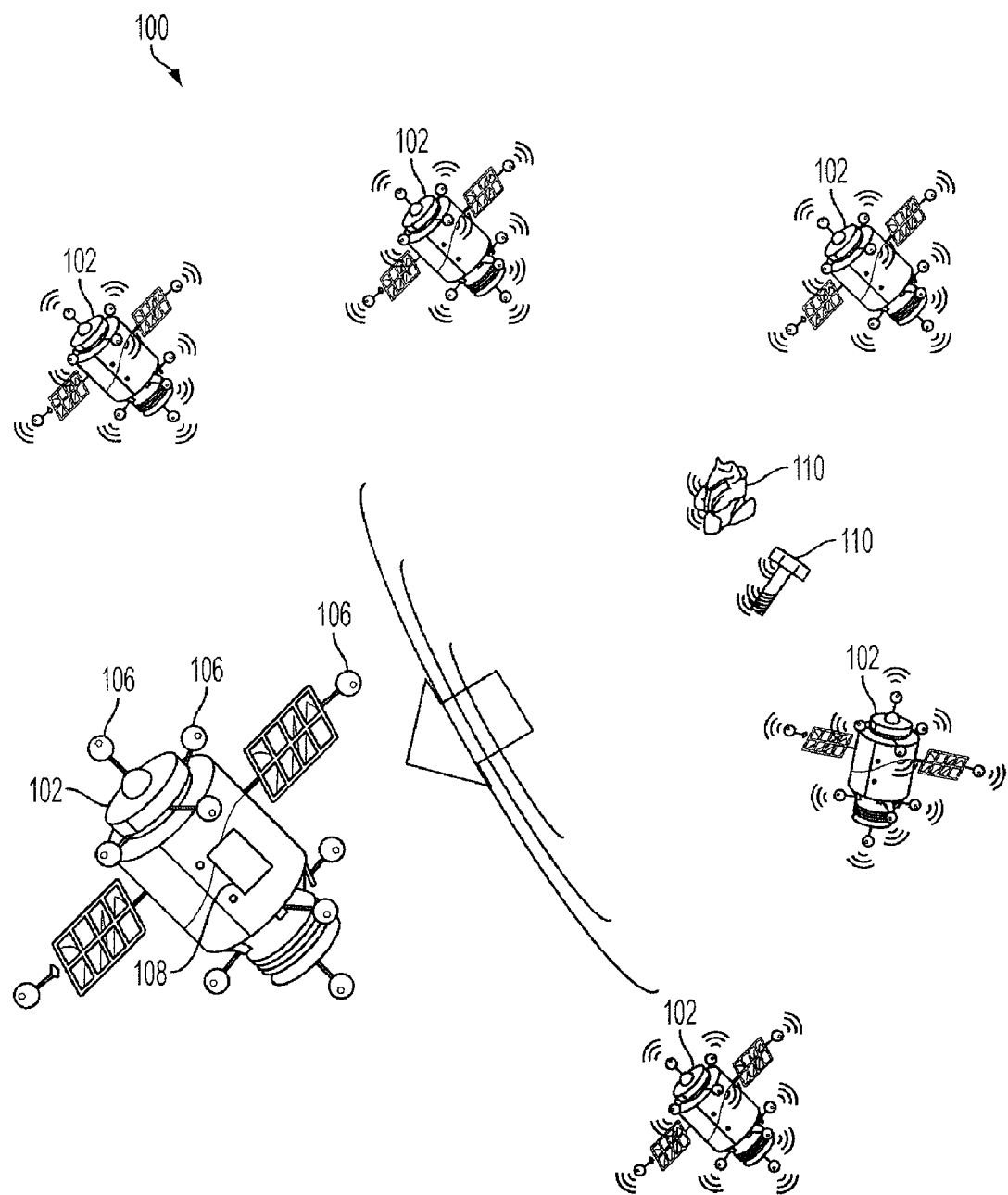
FIG. 4 depicts a spacecraft array of the exemplary system of FIG. 1.

Though a single spacecraft 102 is illustrated in FIGS. 1-3, it is contemplated that system 100 may include any number of spacecrafts 102. For example, as illustrated in FIG. 4, system 100 may include an array of spacecrafts 102 positioned in a predefined relationship to one another, in order to cover a predefined region of space. It will be understood to one of ordinary skill in the art that the number and relative locations of spacecrafts 102 illustrated in FIG. 4 is illustrative and not limiting.

Radiation source 104 is coupled to spacecraft 102. As illustrated in FIGS. 1 and 2, radiation source 104 is configured to transmit a signal into space from spacecraft 102. Radiation source 104 may be configured to periodically or continuously transmit the signal from spacecraft 102.

The signal comprises electromagnetic radiation. Radiation source 104 may transmit any suitable type of electromagnetic radiation. For example, radiation source 104 may be a microwave source, a laser light source for transmitting signals in the infrared, visible, or ultraviolet ranges, a radio-wave source, or may be a source of any other type of electromagnetic radiation. The frequency of radiation transmitted by radiation source 104 may be selected based on the size of the space objects to be detected, the chemical composition of the matter to be detected, or the desired range of the signal, as would be known to one of ordinary skill in the art. For example, radiation having long wavelengths may be suitable for detecting large objects, while radiation having short wavelengths may be suitable for detecting smaller objects.

The signal generated by radiation source 104 may desirably include a carrier component and a signal component. The carrier and signal component frequencies may be selected based on the desired range and performance of system 100. For example, the carrier component may be chosen to be a high frequency to increase the range of propagation of the signal. Additionally, the signal component may be chosen to include a number of distinctive features in order to enable better filtering of noise from the received signal. Radiation source 104 may be configured to transmit signals having multiple different carrier frequencies for adapting the operation of radiation source 104 based on the environment and desired range of propagation of the signal.

Figure 5:
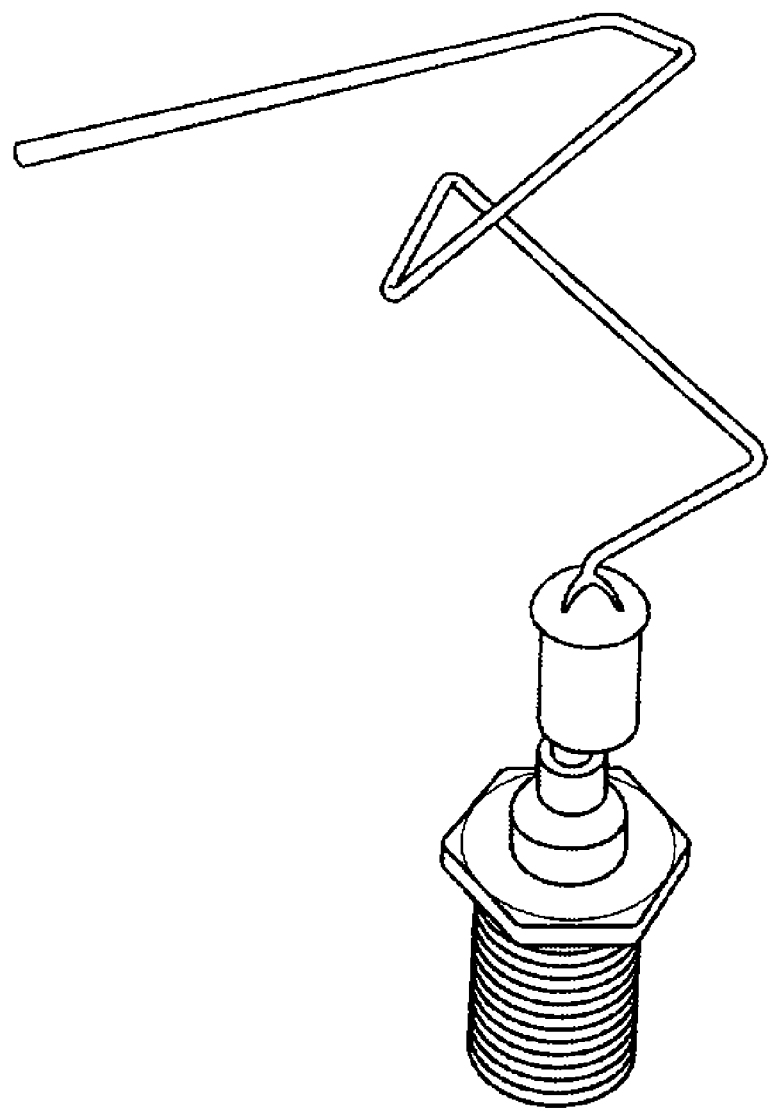
FIG. 5 depicts an antenna of the exemplary system of FIG. 1.

In an exemplary embodiment, radiation source 104 is a radio-frequency (RF) antenna. Radiation source 104 may thus transmit an RF signal from spacecraft 102. The RF antenna may be a high output antenna configured to detect objects in space at long range in a specific direction. The RF antenna may also be configured to transmit RF signals up to a predefined range surrounding spacecraft 102 in all directions. The range and frequency of the RF antenna signal may be selected or limited based on the power available for operation of system 100, as will be understood by one of ordinary skill in the art. Suitable antennas for use as radiation source 104 include, for example, phased-array antennas, parabolic antennas, dipole antennas, planar film antennas, and other lightweight antennas. FIG. 5 illustrates a NASA ST-5 evolutionary antenna, which may be suitable for use as radiation source 104. Other suitable antennas will be known to one of ordinary skill in the art from the description herein.

Alternatively, radiation source 104 may not be a distinct source of radiation. The signal transmitted by radiation source 104 may be derived from pre-existing sources of electromagnetic radiation on spacecraft 102. For example, radiation source 104 may comprise electromagnetic noise that is naturally generated by spacecraft 102 which generate the outgoing signal. Alternatively, radiation source 104 may comprise communication subsystems of spacecraft 102 which generate the outgoing signal.

It is contemplated that any number of radiation sources 104 may be coupled to spacecraft 102. For example, as illustrated in FIG. 2, spacecraft 102 may include an array of radiation sources 104 coupled to various positions of spacecraft 102. It will be understood that each spacecraft 102 may include any number of radiation sources 104, and that the number and relative locations of radiation sources 104 illustrated in the accompanying figures is illustrative and not limiting.

Detectors 106 are also coupled to spacecraft 102. As illustrated in FIGS. 1 and 3, detectors 106 are configured to detect the signal from radiation source 104 after it is reflected off of an object in space 110. Detectors 106 may be configured to detect the type of radiation transmitted from radiation source 104.

In an exemplary embodiment, detectors 106 are RF antennas. Detectors 106 may thus detect an RF signal transmitted from radiation source 104. Suitable antennas for use as detectors 106 include any of the antennas listed above with respect to radiation source 104. It will therefore be understood that the same RF antennas may function as both radiation sources 104 and detectors 106 in system 100, as illustrated in FIGS. 2 and 3. Other suitable antennas will be known to one of ordinary skill in the art from the description herein.

Figure 6:
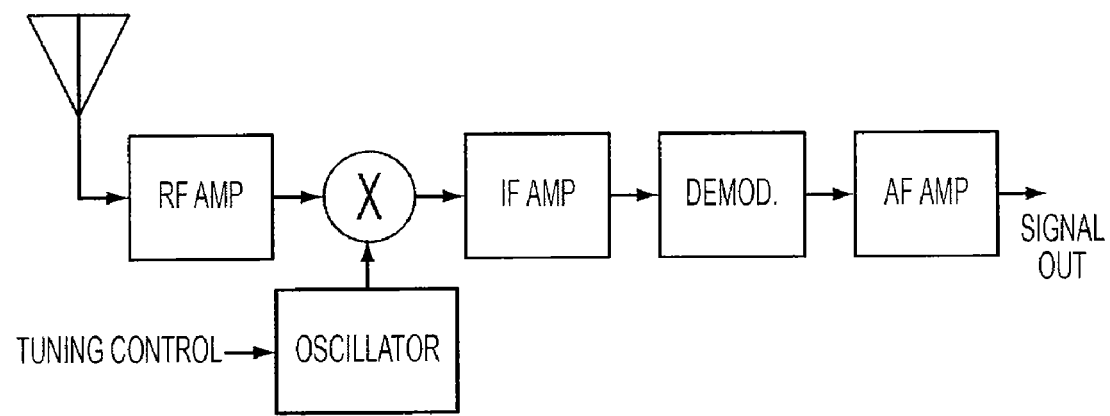
FIG. 6 is a block diagram depicting a superheterodyne of the exemplary system of FIG. 1.

When radiation source 104 and detectors 106 are selected to be RF antennas, each of the RF antennas may be coupled with a heterodyne circuit. The heterodyne coverts low frequency signals to high frequency RF signals for transmission. Additionally, the heterodyne converts the received high frequency RF signals to lower frequency signals, which may be more convenient for processing. In an exemplary embodiment, a superheterodyne may be employed at each antenna. FIG. 6 illustrates a block diagram of an exemplary superheterodyne for use with the present invention. The superheterodyne may allow selective tuning of the frequencies to be transmitted and received by radiation source 104 and detectors 106. Other suitable heterodyne and superheterodyne circuits will be known to one of ordinary skill in the art from the description herein.

It is contemplated that any number of detectors 106 may be coupled to spacecraft 102. For example, as illustrated in FIGS. 1 and 3, spacecraft 102 may include an array of detectors 106 coupled to various positions of spacecraft 102. The number of detectors 106 may be selected based on the desired resolution of system 100.

For example, using a single detector 106 may limit the ability to calculate an angle of approach of the signal. Thus, it may be desirable to use a suite of detectors 106, which may enable the detectors 106 to function in a way similar to a synthetic aperture radar (SAR). An SAR may utilize the separation between each detector 106 to increase the resolution of system 100, thereby allowing controller 108 to better determine the angle of approach of the reflected signal, as will be discussed herein. It will be understood by one of ordinary skill in the art that the number and location of detectors 106 will control the range and angular (both radial and azimuthal) resolutions that can be calculated by controller 108.

It will be understood that each spacecraft 102 may include any number of detectors 106 to correspond to the desired resolutions, and that the number and relative locations of detectors 106 illustrated in FIGS. 1-4 is illustrative and not limiting.

Controller 108 is coupled to spacecraft 102 and is in communication with detectors 106. Controller 108 is programmed to calculate the position of the object in space 110 relative to spacecraft 102. Controller 108 may further be programmed to calculate the speed and direction of movement of the object in space 110 relative to spacecraft 102. Controller 108 performs these calculations based on the signal reflected off the space object 110 that is detected by detectors 106, as will be described herein.

In an exemplary embodiment, controller 108 is a microcontroller integrated with spacecraft 102. Controller 108 controls the operation of radiation source 104 and detectors 106. For example, controller 108 may be programmed to control when radiation source 104 transmits a signal. Additionally, controller 108 may be configured to receive data from detectors 106 when detectors 106 detect the signal reflected from space object 110. Controller 108 may further process the data received from detectors 106 to perform necessary calculations. Suitable microcontrollers for use as controller 108 will be known to one of ordinary skill in the art from the description herein.

Controller 108 may further be programmed to calculate the orbital path of the space object 110 using the position, speed, and direction of movement data for the object 110 calculated by controller 108. Additionally, controller 108 may be preprogrammed with or may be programmed to calculate the orbital path of spacecraft 102. Thus, controller 108 may be programmed to compare the orbital path of space object 110 with the orbital path of spacecraft 102, in order to determine if the space object 110 will come with a predefined range of spacecraft 102, e.g., 15 meters. It may be desirable to determine whether the space object 110 will pass within the predefined range of the spacecraft 102 in order to determine if the space object poses a threat to the operation of the spacecraft 102.

Further, controller 108 may be programmed to activate an alert when the position of the object in space 110, as calculated by controller 108, is within a predefined range of spacecraft 102, e.g., 15 meters. The alert may include, for example, a signal to an on-board controller of the spacecraft 102 or a signal to a ground monitoring station for spacecraft 102. It may be desirable to generate an alert in order to determine whether action needs to be taken to prevent spacecraft 102 from making contact with the object in space 110. Such action may include modifying the orbital path of spacecraft 102.

Where multiple spacecrafts 102 are included in system 100, each spacecraft 102 may include a respective controller 108 for controlling its respective radiation source(s) 104 and detectors 106. Alternatively, only a single spacecraft 102 may include a controller 108, which may be configured as a master controller. A single master controller 108 may be configured to receive data relating to detected signals from the detectors 106 on each of the spacecrafts 102. Thus, the master controller 108 may be programmed to calculate the relative position of space object 110 based on the signals reflected from the space object 110 that are detected by detectors 106 on each spacecraft 102. It will be understood that the number and relative locations of spacecraft 102 including controllers 108 illustrated in the accompanying figures is illustrative and not limiting.

System 100 may further include a digital signal processor (not shown) coupled to spacecraft 102. The digital signal processor may be used to process the signal received by detectors 106. In an exemplary embodiment, the digital signal processor is configured to analyze the signals received by the detectors 106 in real time. The digital signal processor may provide this analysis to controller 108 for performing the above-described calculations. The digital signal processor may be integrated with controller 108, or may be embodied as a separate microprocessor. Suitable digital signal processors will be known to one of ordinary skill in the art from the description herein.

Figure 7:
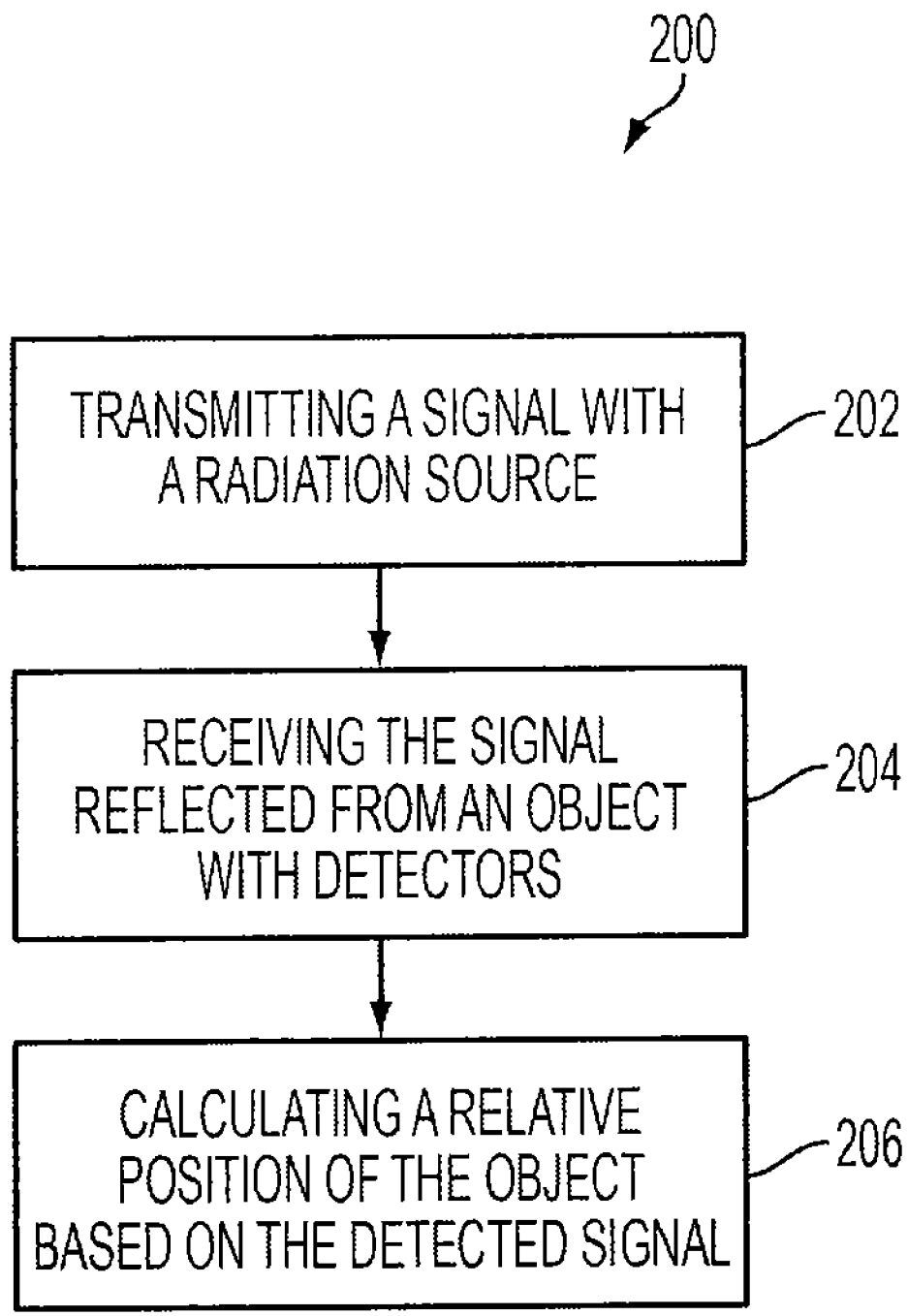
FIG. 7 is a flowchart depicting an exemplary method for detecting an object in space in accordance with aspects of the present invention.

FIG. 7 is a flowchart illustrating an exemplary method 200 for detecting an object in space in accordance with an aspect of the present invention. The method may be employed by a spacecraft that includes at least one radiation source and a plurality of detectors. As an overview, method 200 includes transmitting a signal, detecting the reflected signal, and calculating a relative position of the object in space. For the purposes of illustration, the steps of method 200 are described herein with respect to the components of system 100. Additional details of method 200 are described below.

In step 202, a signal is transmitted. In an exemplary embodiment, radiation source 104 transmits a signal into space from spacecraft 102, as illustrated in FIG. 2. Radiation source 104 may periodically or continuously transmit the signal from spacecraft 102. Further, multiple radiation sources 104 may be spread throughout spacecraft 102 in order to transmit a series of signals to be reflected by space object 110. Radiation sources 104 may each transmit a signal in a step-wise coordinated fashion, i.e., one at a time. As described above, radiation source 104 may transmit any suitable type of electromagnetic radiation.

Additionally, as described above, multiple spacecrafts 102 may each include one or more radiation sources 104. Accordingly, in an exemplary embodiment, one or more radiation sources 104 may transmit the signal into space from one or more spacecrafts 102, as illustrated in FIG. 4.

In step 204, the signal reflected from an object in space is detected. The one or more signals transmitted from radiation source(s) 104 may reflect off of corner reflectors on a space object 110. Upon reflecting off of corner reflectors, the signals may form a wavefront having the space object 110 at its centroid. It may be desirable to detect reflection off of corner reflectors in systems 100 including a single spacecraft 102. In an exemplary embodiment, the signal reflected from space object 110 is detected at detectors 106, as illustrated in FIG. 3. As described above, detectors 106 may detect the type of electromagnetic radiation transmitted by radiation source 104. Further, detectors 106 may comprise the same components as radiation sources 104 or different components from radiation sources 104.

Additionally, as described above, multiple spacecrafts 102 may each include a plurality of detectors 106. Accordingly, in an exemplary embodiment, the signal may be transmitted from one or more radiation sources 104 on a first spacecraft 102. The signal may be reflected from a space object 110, and may be detected with detectors 106 on a second spacecraft 102, as illustrated in FIG. 4. In another exemplary embodiment, the signal may be transmitted from one or more radiation sources 104 on a spacecraft 102. The signal may be reflected in multiple different directions from a space object 110, and may be detected with detectors 106 on multiple different spacecrafts 102.

In step 206, a relative position of the object in space is calculated. In an exemplary embodiment, controller 108 calculates the position of space object 110 relative to spacecraft 102 based on the signal reflected from space object 110 and detected by detectors 106.

For example, controller 108 may store data indicating when the signal was transmitted by radiation source 104 and when the signal was received by detectors 106. Using this data in conjunction with a known speed of the signal, controller 108 may determine how far away the space object 110 is from the spacecraft 102, as would be understood by one of ordinary skill in the art. Additionally, as described above, when signals are reflected from space object 110, they may form a wavefront having the space object 110 at its centroid. Controller may therefore use multiple detectors 106, configured like a synthetic aperture radar (SAR), to determine the direction of travel of the wavefront based on when each detector 106 on spacecraft 102 receives the signal. If detectors 106 are not positioned in the same plane, but instead are positioned three-dimensionally with respect to each other, a delay may occur between detection of the signal by a first detector 106 and detection of the same signal by a second detector 106. By determining the position of each detector 106 and the time at which each detector 106 receives the reflected signal, the controller 108 may determine the direction of travel of the wavefront, as would be understood by one of ordinary skill in the art. Positioning detectors 106 in three dimensions may allow controller 108 to calculate the direction of space object 110 in both radial and azimuthal angles. Thereby, controller 108 may calculate the direction of space object 110.

By determining the distance of space object 110 from spacecraft 102, and the direction of space object 110 from spacecraft 102, as described above, controller 108 may calculate the position of any object in space 110.

Additionally, as described above, multiple spacecrafts 102 may each include a controller 108. Accordingly, in an exemplary embodiment, a controller 108 may control the radiation sources 104 and detectors 106 for its respective spacecraft 102. Further, a controller 108 may calculate the position of a space object 110 based on the signal detected by the detectors 106 of its respective spacecraft 102. In another exemplary embodiment, only a single spacecraft 102 may include a controller 108, which may be configured as a master controller. Master controller 108 may be configured to communicate with each spacecraft 102, for example, via a network. The master controller 108 may thereby control the detectors 106 for each spacecraft 102. Further, the master controller 108 may calculate the position of a space object 110 based on the signal detected by the detectors 106 of each spacecraft 102.

Method 200 may include a number of additional optional steps relating to the function of controller 108.

For example, controller 108 may further calculate the speed and direction of movement of space object 110 relative to spacecraft 102 based on the signal reflected from space object 110 and detected by detectors 106. For example, the signal received by detectors 106 may include a Doppler shift. Controller 108 may analyze the Doppler shift in the detected signal to determine a radial speed and direction of movement of the object in space 110 relative to spacecraft 102. Controller 108 may further calculate the change in position of space object 110 in multiple intervals to determine an angular speed and direction of movement of the object in space 110 relative to spacecraft 102. Thereby, controller 108 may calculate the speed and direction of movement of space object 110 relative to spacecraft 102.

Further, controller 108 may calculate the orbital path of space object 110 based on the position, speed, and direction of movement data for the object 110 calculated by controller 108. As described above, controller 108 may compare the orbital path of space object 110 with the orbital path of spacecraft 102, in order to determine if the space object 110 will come with a predefined range of spacecraft 102, e.g., 15 meters. As described above, it may be desirable to determine whether the space object 110 will pass within a predefined range of the spacecraft 102 in order to determine if the space object poses a threat to the operation of the spacecraft 102.

Still further, controller 108 may activate an alert when the position of the object in space 110, as calculated by controller 108, is within a predefined range of spacecraft 102, e.g., 15 meters. When the alert is activated, radiation source 104 and detectors 106 may continuously transmit and receive signals in order to continuously monitor the position of space object 110. As described above, it may be desirable to generate an alert in order to determine whether action needs to be taken to prevent spacecraft 102 from making contact with the object in space 110.

Controller 108 may deactivate the alert when the position of the object in space 110 is beyond the predefined range. Alternatively, controller 108 may deactivate the alert when it is determined by controller 108 that, based on the orbital path of the space object 110, it will not contact spacecraft 102.

Figure 8:
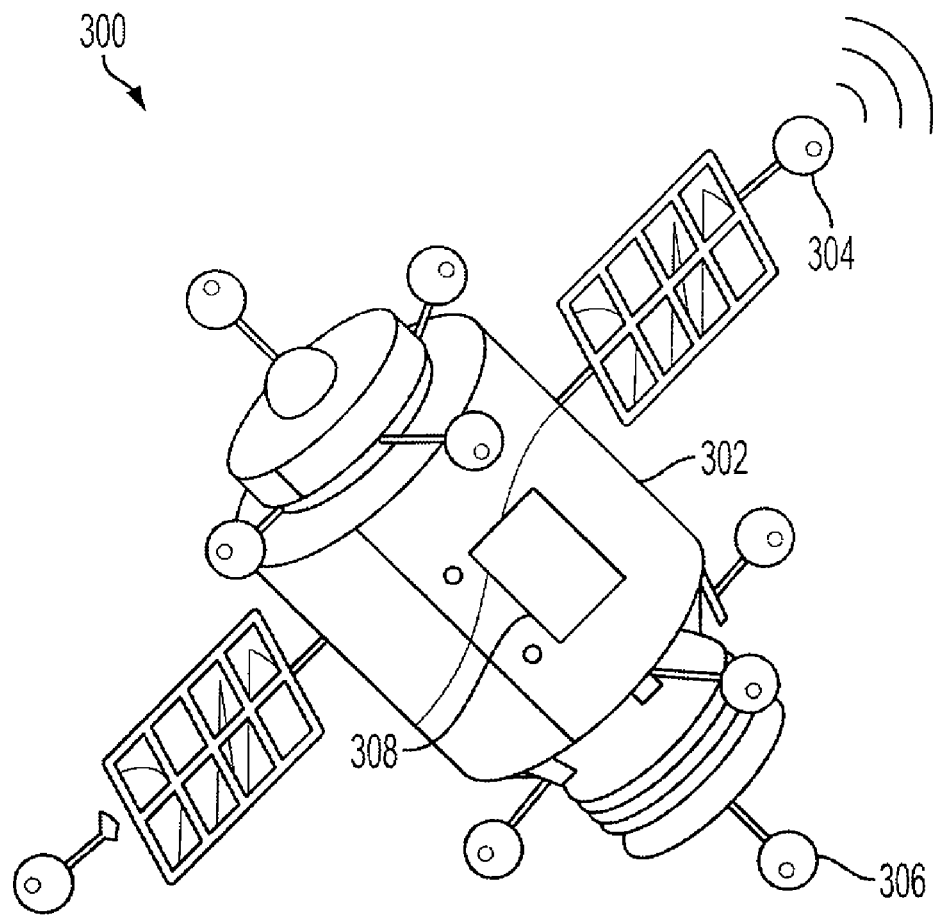
FIG. 8 depicts an exemplary system for detecting space weather in accordance with aspects of the present invention.
Figure 9:
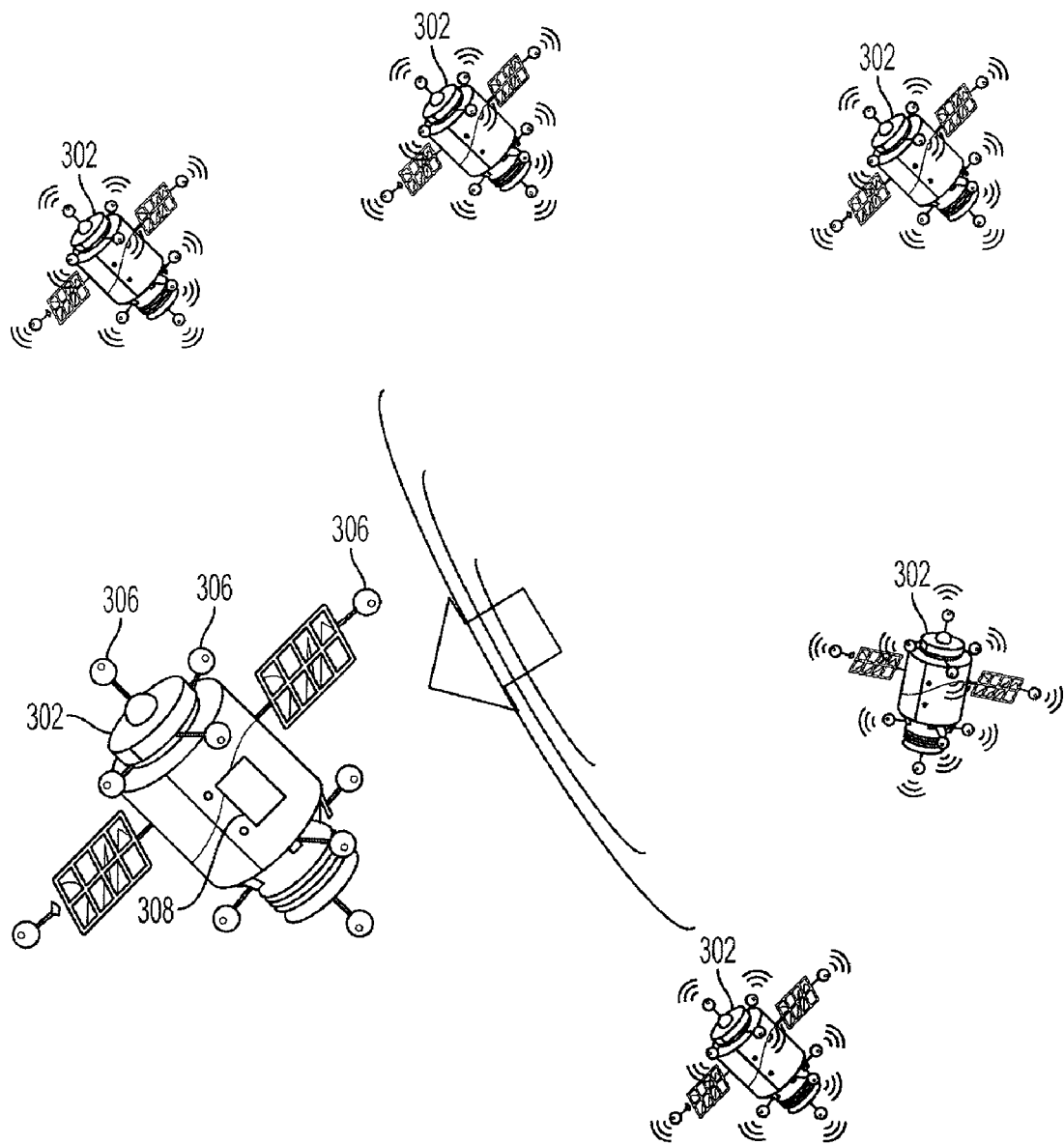
FIG. 9 depicts a spacecraft array of the exemplary system of FIG. 8.

FIGS. 8 and 9 are exemplary systems 300 for detecting space weather in accordance with aspects of the present invention. As an overview, system 300 includes a spacecraft 302, a radiation source 304, a detector 306, and a controller 308. The components of system 300 are similar to those described with respect to system 100, except for those differences described below.

Spacecraft 302 is a device configured for operation in space. Spacecraft 302 is a spacecraft substantially as described above with respect to spacecraft 102.

Figure 10:
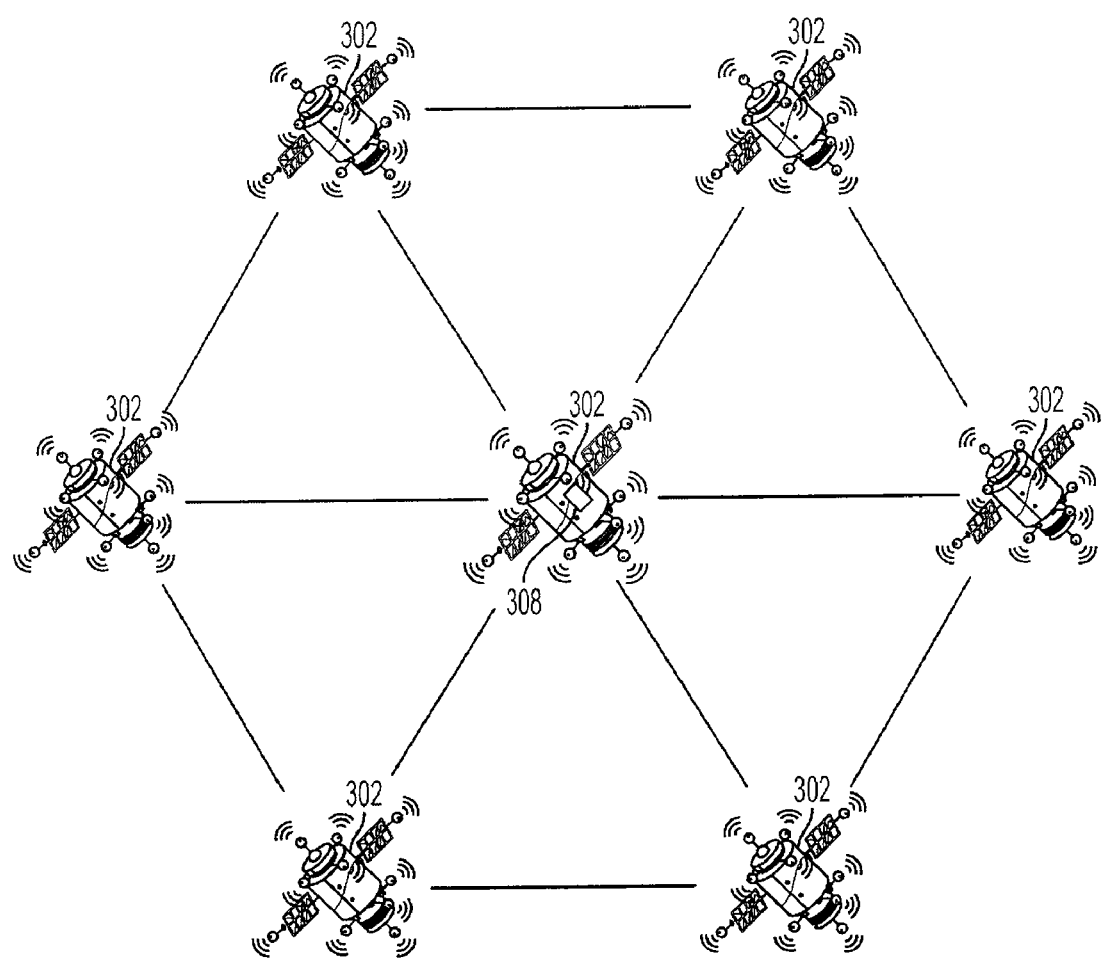
FIG. 10 depicts another spacecraft array of the exemplary system of FIG. 8.

Though a single spacecraft 302 is illustrated in FIG. 8, it is contemplated that system 300 may include any number of spacecrafts 302. For example, as illustrated in FIGS. 9 and 10, system 300 may include an array of spacecrafts 302 positioned in a predefined relationship to one another, in order to cover a predefined portion of space. It will be understood to one of ordinary skill in the art that the number and relative locations of spacecrafts 302 illustrated in FIGS. 9 and 10 is illustrative and not limiting.

Radiation source 304 is coupled to spacecraft 302. As illustrated in FIGS. 8 and 9, radiation source 304 is configured to transmit a signal into space from spacecraft 302. Radiation source 304 is a radiation source substantially as described above with respect to radiation source 104.

Radiation source 304 may transmit any suitable type of electromagnetic radiation. The frequency of radiation transmitted by radiation source 304 may desirably be selected based on the plasma frequency of the space weather to be detected. For example, the frequency of radiation may be selected to be below or approximately the same as the plasma frequency of the electron plasma desired to be detected by system 300. Alternatively, the frequency of radiation transmitted by radiation source 304 may be selected based on the distance to be traversed by the signal.

It is contemplated that any number of radiation sources 304 may be coupled to spacecraft 302. For example, as illustrated in FIG. 9, spacecrafts 302 may include an array of radiation sources 304 coupled to various positions of spacecrafts 302. It will be understood that each spacecraft 302 may include any number of radiation sources 304, and that the number and relative locations of radiation sources 304 illustrated in the accompanying figures is illustrative and not limiting.

Detector 306 is also coupled to spacecraft 302. As illustrated in FIGS. 8 and 9, detector 306 is configured to detect the signal from radiation source 304. Detector 306 is a detector substantially as described above with respect to detectors 106.

In an exemplary embodiment, radiation source 304 and detector 306 may be different components (e.g., distinct RF antennas). In this embodiment, a first RF antenna may transmit a signal that traverses a region of space. The space weather in the region of space may affect the RF signal. For example, plasma in the region of space traversed by the signal may interfere with, delay, generate noise in, or otherwise alter the transmitted RF signal. A second RF antenna may then receive the altered RF signal after it traverses the region of space including the plasma. The second RF antenna may be coupled to the same or a different spacecraft 302 as the first RF antenna.

Alternatively, both radiation source 304 and detector 306 may be the same component (e.g., an RF antenna). In this embodiment, an RF antenna may transmit a signal that traverses a region of space. The space weather in the region of space may affect the RF signal. For example, plasma in the region of space traversed by the signal will have a plasma frequency that may reflect, absorb, or refract the transmitted RF signal. The same RF antenna may then receive the RF signal if it has been reflected by the electron plasma.

It is contemplated that any number of detectors 306 may be coupled to spacecraft 302. For example, as illustrated in FIGS. 8 and 9, spacecraft 302 may include an array of detectors 306 coupled to various positions of spacecraft 302. It will be understood that each spacecraft 302 may include any number of detectors 306, and that the number and relative locations of detectors 306 illustrated in the accompanying figures is illustrative and not limiting.

Controller 308 is coupled to spacecraft 302 and is in communication with detector 306. Controller 308 is programmed to calculate a parameter of the plasma in the region of space traversed by the signal. For example, controller 308 may be programmed to calculate a plasma frequency of the plasma in the region of space traversed by the signal. Controller 308 performs this calculation based on the signal detected by detectors 106, as will be described herein.

In an exemplary embodiment, controller 308 is a microcontroller integrated with spacecraft 302. Controller 308 may be a controller substantially as described above with respect to controller 108.

Further, controller 308 may be programmed to activate an alert when the plasma parameter calculated by controller 308 is above a predefined threshold. For example, controller 308 may activate an alert when the plasma frequency in the region of space traversed by the signal is above, e.g., 50 MHz. The alert may include, for example, a signal to an on-board controller of the spacecraft 302 or a signal to a ground monitoring station for spacecraft 302. It may be desirable to generate an alert in order to determine whether action needs to be taken to prevent spacecraft 302 from being damaged by the detected space weather. Such action may include temporarily powering down, surge protecting, or insulating one or more electrical systems of spacecraft 302, to prevent them from being damaged by the electron plasma.

For systems 300 including multiple spacecrafts 302, each spacecraft 302 may include a respective controller 308 for controlling the radiation source 304 and detector 306 for the respective spacecraft, as illustrated in FIG. 9 and described above with respect to system 100. Alternatively, only a single spacecraft 302 may include a controller 308, which may be configured as a master controller, as illustrated in FIG. 10 and described above with respect to system 100. The master controller 308 may be programmed to calculate the plasma parameter based on the signals detected by detector 306 on each spacecraft 302. It will be understood that the number and relative locations of spacecraft 302 including controllers 308 illustrated in FIGS. 9 and 10 is illustrative and not limiting.

Figure 11:
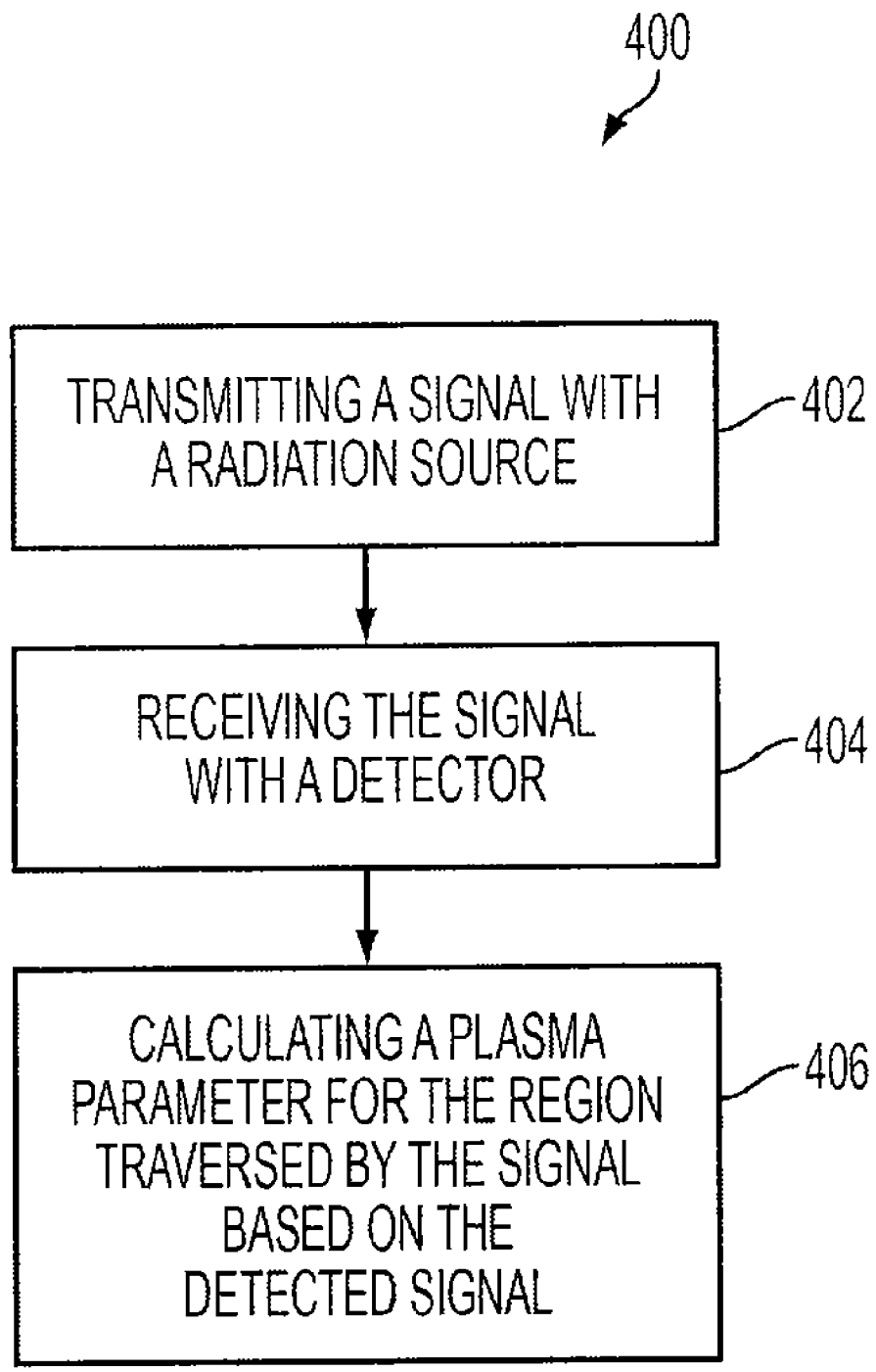
FIG. 11 is a flowchart depicting an exemplary method for detecting space weather in accordance with aspects of the present invention.

FIG. 11 is a flowchart illustrating an exemplary method 400 for detecting space weather in accordance with an aspect of the present invention. The method may be employed by a spacecraft that includes at least one radiation source and at least one detector. As an overview, method 400 includes transmitting a signal, detecting the signal, and calculating a plasma parameter in a region traversed by the signal. For the purposes of illustration, the steps of method 400 are described herein with respect to the components of system 300. Additional details of method 400 are described below.

In step 402, a signal is transmitted. In an exemplary embodiment, radiation source 304 transmits a signal into space from spacecraft 302, as illustrated in FIG. 8. Radiation source 304 may periodically or continuously transmit the signal from spacecraft 302. Further, multiple radiation sources 304 may be spread throughout spacecraft 102 in order to transmit a series of signals. Radiation sources 304 may each transmit a signal in a step-wise coordinated fashion, i.e., one at a time. As described above, radiation source 304 may transmit any suitable type of electromagnetic radiation.

Additionally, as described above, multiple spacecrafts 302 may each include one or more radiation sources 304. Accordingly, in an exemplary embodiment, one or more radiation sources 304 may transmit the signal into space from one or more spacecrafts 302, as illustrated in FIG. 9.

In step 404, the signal is detected. In one exemplary embodiment, the one or more signals transmitted from radiation source(s) 304 may be altered by traversing a region including electron plasma. The altered signal transmitted from radiation source 304 may be detected by detector 306, as illustrated in FIG. 9. In an alternative exemplary embodiment, the one or more signals may be reflected by electron plasma in the region traversed by the signal. Electron plasma may reflect the signal transmitted by radiation source 304 when the signal has a frequency that is less than or equal to the plasma frequency of the electron plasma. The reflected signal transmitted from radiation source 304 may be detected by detector 306. As described above, detector 306 may detect the type of electromagnetic radiation transmitted from radiation source 304. Further, detector 306 may comprise the same component as radiation source 304 or a different component from radiation source 304.

Additionally, as described above, multiple spacecrafts 302 may each include one or more detectors 306. Accordingly, in one exemplary embodiment, the signal may be transmitted from at least one radiation source 304 on a first spacecraft 302. The signal may be altered or distorted by an electron plasma, and may then be received by a detector 306 on the first spacecraft 302, as illustrated in FIG. 8. In another exemplary embodiment, the signal may be transmitted from at least one radiation source 304 on a first spacecraft 302. The signal may be altered or distorted by an electron plasma, and may then be received by a detector 306 on a second spacecraft 302. In yet another exemplary embodiment, the signal may be transmitted from at least one radiation source 304 on a first spacecraft 302. The signal may then be reflected from an electron plasma, and may be detected with a detector 306 on a second spacecraft 302, as illustrated in FIG. 9. In still another exemplary embodiment, the signal may be transmitted from at least one radiation source 304 on a spacecraft 302. The signal may be reflected or refracted in many different directions from an electron plasma, and may be detected with detectors 306 on multiple different spacecrafts 302.

In step 406, a parameter of the plasma in a region of space traversed by the signal is calculated. In an exemplary embodiment, controller 308 calculates the plasma parameter for a region of space traversed by the signal based on the signal detected by detector 306.

For example, controller 308 may store data relating to baseline characteristics of a signal transmitted by radiation source 304 and detected by detector 306 when no plasma is present. Controller 308 may compare these baseline characteristics of the signal with the signal that has traversed a region of space including plasma.

Controller 308 may thereby calculate differences between the detected signal and the baseline characteristics for the signal. The differences between the detected signal and the baseline signal may be caused by disruptions due to space weather, and more particularly, by electron plasma.

For example, the signal may be delayed in traversing a region including electron plasma. Controller 308 may store data indicating when the signal was transmitted by radiation source 304 and when the signal was received by detector 306. Using this data in conjunction with a known speed of the signal, controller 108 may determine the length of time the signal was delayed by the space weather, as would be understood by one of ordinary skill in the art.

For other examples, the signal's amplitude may be diminished by traversing a region containing electron plasma, or the signal's phase may be changed by traversing a region containing electron plasma. Similarly as described above, controller 308 may compare the detected signal with a baseline signal in order to determine the magnitude of the change in amplitude or phase. By quantifying these changes to the signal, controller 308 may calculate parameters of the plasma in the region traversed by the signal.

Additionally, as described above, multiple spacecrafts 302 may each include a controller 308. Accordingly, in an exemplary embodiment, a controller 308 may control the radiation source 304 and detector 306 for its respective spacecraft 302. Further, a controller 308 may calculate the plasma parameters for the region traversed by the signal based on the signal detected by the detector 306 of its respective spacecraft 302. In another exemplary embodiment, only a single spacecraft 302 may include a controller 308, which may be configured as a master controller, as illustrated in FIG. 10. The master controller 308 may control the radiation sources 304 and detectors 306 for each spacecraft 302. Further, the master controller 308 may calculate the plasma parameters for the regions traversed by the signals based on the signals detected by the detectors 306 of each spacecraft 302.

Method 400 may include a number of additional optional steps relating to the function of controller 308.

Controller 308 may activate an alert when the plasma parameter for the region of space traversed by the signal, as calculated by controller 308, is above a predefined threshold. For example, controller 308 may activate an alert when a calculated plasma frequency is above, e.g., 50 MHz. As described above, it may be desirable to generate an alert in order to determine whether action needs to be taken to prevent spacecraft 302 from being damaged by the detected space weather.

Although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A system for detecting space weather, comprising:
   at least one spacecraft;
   at least one radiation source coupled to the at least one spacecraft, the at least one radiation source configured to transmit a signal;
   at least one detector coupled to the at least one spacecraft, the at least one detector configured to receive the signal; and
   a controller in communication with the at least one detector, the controller programmed to calculate a plasma parameter in a region traversed by the signal based on the detected signal.

2. The system of claim 1, wherein the at least one spacecraft comprises a plurality of spacecrafts, each spacecraft being coupled with at least one radiation source configured to transmit the signal and at least one detector configured to receive the signal.

3. The system of claim 2, wherein the controller is a master controller and is programmed to calculate the plasma parameter in the region traversed by the signal based on the signal detected by the at least one detector of each spacecraft.

4. The system of claim 1, wherein the at least one radiation source and the at least one detector comprise different antennas.

5. The system of claim 1, wherein
   the at least one radiation source and the at least one detector comprise the same antenna, and
   the signal is reflected from a plasma in the region traversed by the signal.

6. The system of claim 1, further comprising an alert, wherein the controller is programmed to activate the alert when the plasma parameter is above a predefined threshold.

7. A method for detecting space weather with at least one spacecraft, the at least one spacecraft including at least one radiation source and at least one detector, the method comprising the steps of:
   transmitting a signal with the at least one radiation source;
   detecting the signal with the at least one detector; and
   calculating with a controller a plasma parameter in a region traversed by the signal based on the detected signal.

8. The method of claim 7, wherein
the at least one spacecraft comprises a plurality of spacecrafts, each spacecraft including at least one radiation source and at least one detector,
the transmitting step comprises transmitting the signal with the at least one radiation source of a first spacecraft, and
the detecting step comprises detecting the signal with the at least one detector of a second spacecraft.

9. The method of claim 7, wherein the at least one radiation source and the at least one detector comprise different antennas.

10. The method of claim 7, wherein the at least one radiation source and the at least one detector comprise the same antenna, and
the signal is reflected from a plasma in the region traversed by the signal.

11. The method of claim 7, further comprising the step of:
activating an alert when the plasma parameter is above a predefined threshold.

12. A system for detecting an object in space, comprising:
at least one spacecraft;
at least one radiation source coupled to the at least one spacecraft, each radiation source configured to transmit a signal;
a plurality of detectors coupled to the at least one spacecraft, the plurality of detectors each configured to detect a respective signal reflected from the object; and
a controller coupled to the spacecraft and in communication with the plurality of detectors, the controller programmed to calculate a relative position of the object based on the detected signals;
wherein the plurality of detectors includes a corresponding plurality of antennas and the antennas are installed on the one spacecraft at locations forming a non-gridded pattern.

13. The system of claim 12, wherein the at least one spacecraft comprises a plurality of spacecrafts, each spacecraft coupled to at least one radiation source, each configured to transmit a respective signal, and a plurality of detectors, each configured to receive the respective signal reflected from the object.

14. The system of claim 13, wherein the controller is a master controller and is programmed to calculate the relative position of the object based on the respective signal detected by the plurality of detectors of each spacecraft.

15. The system of claim 12, wherein the controller is programmed to calculate a relative speed of the object based on the detected signals.

16. The system of claim 12, wherein
the controller is programmed to calculate an orbital path of the object,
the controller is programmed to determine whether the object will pass within a predefined range of the spacecraft based on the orbital path of the object and an orbital path of the spacecraft.

17. The system of claim 12, further comprising an alert, wherein the controller is programmed to activate the alert when the position of the object is within a predefined range of the spacecraft.

* * * * *